United States Patent [19]

Newman

[11] Patent Number: 4,625,306
[45] Date of Patent: Nov. 25, 1986

[54] DATA SIGNAL SWITCHING SYSTEMS
[75] Inventor: Peter Newman, Middlesex, England
[73] Assignee: The General Electric Company, p.l.c., England
[21] Appl. No.: 677,065
[22] Filed: Nov. 30, 1984
[30] Foreign Application Priority Data
  Dec. 16, 1983 [GB] United Kingdom ............... 8333519
[51] Int. Cl.[4] ........................................... H04Q 11/04
[52] U.S. Cl. ........................................ 370/60; 370/16
[58] Field of Search ................... 370/58, 60, 16, 94; 340/825.52

[56] References Cited

U.S. PATENT DOCUMENTS

| 4,276,643 | 6/1981 | Laprie et al. | 370/16 |
| 4,308,613 | 12/1981 | Chasek | 370/16 |
| 4,314,367 | 2/1982 | Bakka et al. | 370/60 |

FOREIGN PATENT DOCUMENTS 0018754 11/1980 European Pat. Off.
1529075 4/1976 United Kingdom.

OTHER PUBLICATIONS

IEEE Transactions on Computers, vol. C-28, No. 10, Oct. 1979, "Binary Routing Networks", by A. Hopper et al.

Primary Examiner—Douglas W. Olms
Assistant Examiner—Kenneth I. Rokoff
Attorney, Agent, or Firm—Kirschstein,Kirschstein, Ottinger & Israel

[57] ABSTRACT

To effect transfer of messages between data units (1–4, 5–8) a switching network of binary distributors (21–24, 31–38) and concentrators (41–48, 51–54) is used. For each distributor in the network the message is preceded by a respective single data bit which is absorbed in the switching system. Thus at the message destination all addressing bits have been absorbed, only the required message being received. Concentrators have both input paths enabled to their respective output paths except when a message is passing through the concentrator when the non-transmitting path is disabled.

Any message arriving at a blocked concentrator is lost. Accordingly an acknowledging system uses a reverse path set up in parallel with the forward path to acknowledge receipt of the message. Alternatively the reverse path may be used to return a message fail indication from a blocked concentrator.

5 Claims, 9 Drawing Figures

DATA SIGNAL SWITCHING SYSTEMS

The present invention relates to data signal switching systems and more particularly but not exclusively to such systems for transferring data between processors in a multi-processor data processing system.

In multiprocessor systems it is necessary for data to be transferred between processors for transferring, for example, "tasks" to other processors from an operating system or to provide the results of such "tasks" for further processing. This data transfer takes the form now known as a "message".

In the communication of such data two methods are commonly employed the first of these being circuit switching-namely establishing a circuit path between two units between which data transfer is required and retaining that path for the duration of the message transfer. The second method is that known as "packet switching" in which the data message to be sent is divided into fixed length "packets" of data to each of which is added a network address, the combined data and address being transmitted into the network which links all possible message recipients. The intended recipient has access to all "packets" transmitted on the network and selects, by use of the network address, those packets of data addressed to it.

Each of the above two methods has its own disadvantages. In the case of circuit switching the network resources needed for data transfer are required to be set up and remain set up (that is they are exclusively occupied by the transmitting and receiving device) for the duration of data transfer. In the case of packet switching a significant data "overhead" is present in the form of the network address required for each data packet.

It is an object of the present invention to provide a data signal switching system which has a lower data overhead requirement than a packet switching system and a lower switch occupancy than a circuit switching system.

For the avoidance of doubt, the following definitions are given of terms used herein:

The term "concentrator" means a switch having a plurality of inputs and an output to which any one of the plurality of inputs may be exclusively and selectively connected.

The term "distributor" means a switch having an input and a plurality of outputs to any one of which the input may be exclusively and selectively connected.

"Contention" occurs if a data string arrives at one of the inputs of a concentrator in which an exclusive connection between another input of the concentrator and the output is already in use (i.e. the concentrator is not "free").

A "message" is a string of digital data at least the first digit of which defines a route through the switching system.

According to the present invention in a digital data signal switching system, a plurality of distributors as hereinbefore defined are interconnected to provide a plurality of selectable transmission paths each of which connects one of a plurality of inputs of the system to one of a plurality of outputs of the system and each of said distributors is arranged to respond to the first digit of a message as hereinbefore defined on arrival at an input thereof to select a path from that input to an output of the distributor in dependance upon the value of that first digit and in so doing to omit the first digit from the message passed on, the arrangement being such that in passing through a plurality of said distributors each of which selects a respective path to an output thereof in the manner aforesaid the message is progressively shortened by the omission of respective "first" digits.

Preferably the system carries binary-coded messages and each distributor has one input and two outputs, the output being selected in dependance upon the first bit of a message received at the input.

The system may include a plurality of concentrators arranged to permit connection of each one of the plurality of outputs to more than one of the plurality of inputs of the system. In such a system a message in contention as hereinbefore defined may fail to be transmitted through the system and a backward path may be set up in parallel with each selectable transmission path to permit the return of an acknowledgement message the absence of which indicates the failure of a transmitted message due to contention. Alternatively or additionally any busy concentrator detecting a seize signal may return an equipment busy indication by use of the backward path.

The switching system may comprise a number of nodes each of which includes a distributor, a concentrator and control means, the control means being arranged to cause the selection of a path through the distributors in dependance upon the first digit of a message and to cause the selection of a corresponding backward transmission path through the concentrators.

In one form the system comprises a plurality of such nodes connected in a loop formation. In one loop system forward transmission is permitted in only one direction but in an alternative system bothway transmission is provided such that a transmission path between any of the plurality of inputs of the system and of the plurality of outputs of the system may be selectively effected in either direction of transmission.

Such nodes may be provided by use of an integrated circuit of the kind known as an uncommitted logic array when appropriately connected. Alternatively a programmeable logic array may be used.

A data signal switching system in accordance with the invention will now be described by way of example only with reference to the accompanying drawings of which.

Figure 1:
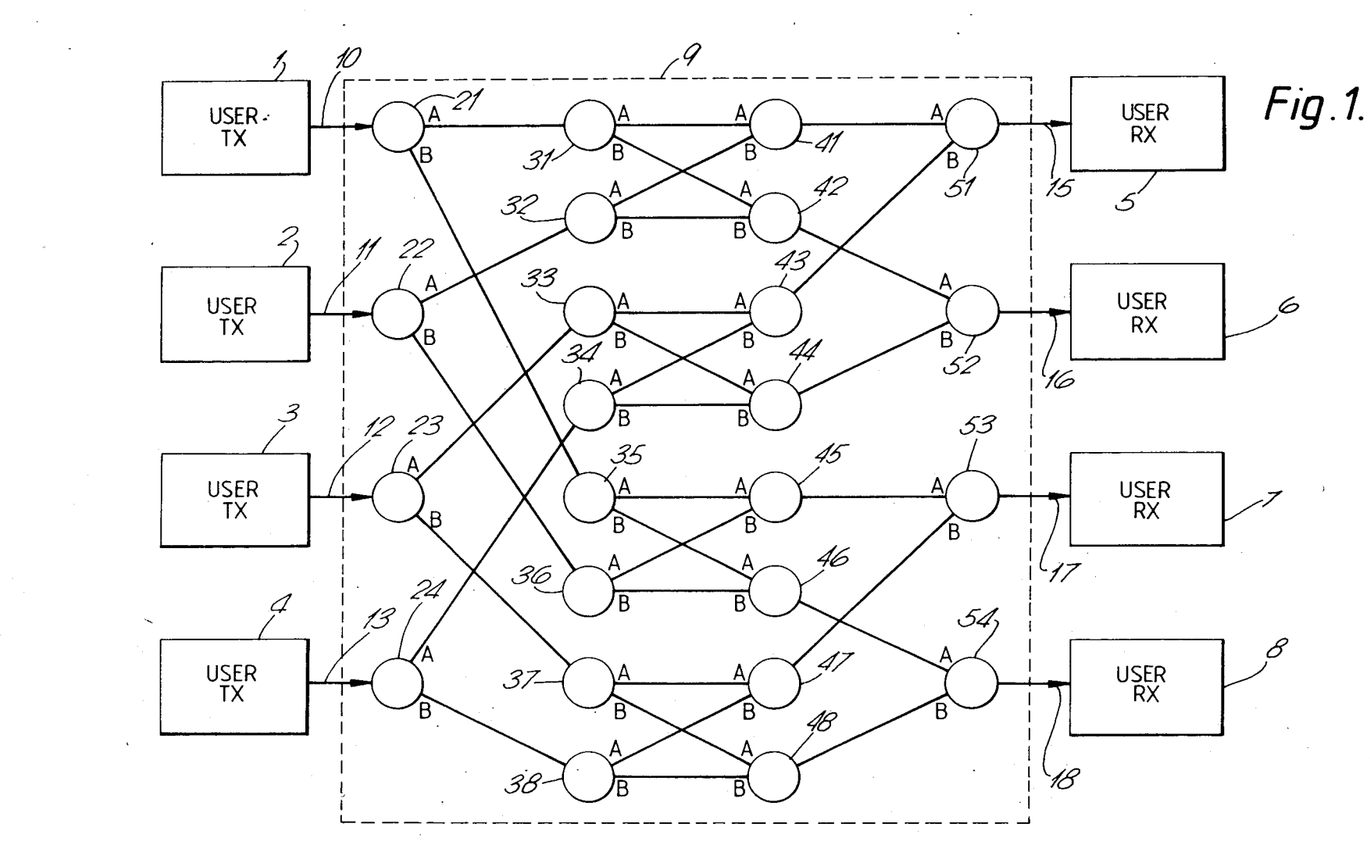
FIG. 1 is a schematic diagram of a unidirectional data signal switching system for interconnecting four data signal senders to four data signal receivers.

Referring to FIG. 1 the system essentially comprises a network 9 which provides selectable switched transmission paths between a number of "user" transmitters 1-4 and a number of "user" receivers 5-8. The "users" referred to above may be for example computer systems, telephone apparatus, or data terminals, all of which include some means of providing an address header to a data string to form a message.

The address header could be provided by a microprocessor for example or in the case of apparatus which always transmits messages to the same output of the network a fixed address heading circuit.

The network 9 shown has four inputs 10-13 and four outputs 15-18 and by use of switched paths an interconnection may be established between any one of the inputs 10-13 and any one of the outputs 15-18 at any particular time. It will be appreciated that the user receivers 5-8 may be co-located with the user transmitters 1-4 to provide full intercommunication for four user apparatuses but as will become apparent the node equipments described hereinafter provide bi-directional transmission paths which have been omitted from FIG. 1 and the description thereof for simplicity.

The network 9 has distributors 21-24 in a first switching group each of which has each of its two outputs connected to a respective distributor (31-38) in a second switching group. To assist with the description, the two outputs of each of the distributors 21-24, 31-38 are designated 'A' and 'B' and where reference to a particular output, say, 'A' of one of the distributors, say, 31 is required it is referred to hereinafter as the output 31A. A similar designation scheme is adopted for the two inputs of each concentrator.

Each of the outputs of each of the distributors 31-38 is connected to one respective input of two different concentrators in a first switching group of concentrators 41-48 each of which has its output connected to one of the inputs of one concentrator in a second switching group of concentrators 51-54. The outputs of the concentrators 51-54 are the outputs 15-18 of the network 9.

The network 9 is switched by a message. A transmission path is not set up in advance of transmission of data through the network but rather is set up during bit periods of the message route. For a message to pass through the network 9 two routing bits are required to dictate the path through the switching groups of distributors. The concentrators however as described hereinafter are not switched per se to the active, selected, path but disable the non-selected path. Thus no "switching" time is required for them.

Figure 8:
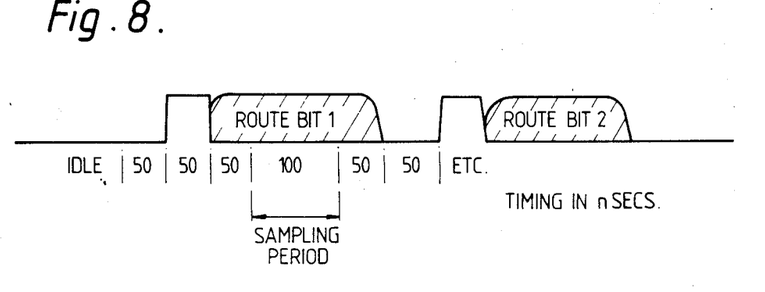
FIG. 8 is a timing diagram of a part of a message.

Thus referring to FIG. 8 in a ten megabit per second (binary) switching system a data string (of any length) is preceded by an address header comprised of route bit 1 and route bit 2 each of which (for a particular system) is substantially 200 nano-seconds in duration and each routing bit may be preceded by a fifty nano-second seize pulse and followed by a fifty nano-second null. Alternatively, as may be seen from the description hereafter where a clock path, switched in parallel with a data path is provided, seize detection may be by use of clock signals in which case a 'seize' pulse is not required. It will be appreciated that the number of routing bits will vary from network to network and/or from message to message in dependance upon the organisation of the network and the route selected by the user apparatus for a particular message.

Referring again to FIG. 1, if the apparatus which uses one of the user transmitters, say, 2 generates a data string which is required by the apparatus which receives by way of one of the user receivers, say, 7 and assuming that a binary '0' selects the 'A' output of a distributor and a binary '1' selects the 'B' output of a distributor the sending apparatus will precede the data string by an address header of '10'. The address may be determined by means of a "look up" table in the apparatus.

Having assembled the message in the form '10 NN . . . N' (where NN . . . N is the required data) the apparatus will cause it to be transmitted by the user transmitter 2 to the input 11. On detecting the fifty nanosecond seize pulse at its input, control means of the distributor 22 will use the first bit (value 1) to select the output 22B. The selection of the output 22B occurs during the transmission time (300 nano-seconds maximum) of that first bit which is not forwarded by the distributor 22. Thus the message output from the distributor 22 is "ONN . . . N".

As may be seen the output 22B is connected to the input of the distributor 36 the control means of which will detect the seize pulse associated with the first bit (the '0') of the shortened message. Thus the control means causes the distributor 36 to select the output 36A (again during the transmission period of that bit) and the message forwarded to the input 45B is the original data "NN . . . N".

It is here noted that neither the distributors nor the concentrators have storage facilities. Path selection in the distributors occurs during the bit time of the respective routing bits, the message being shortened by one bit at each selection stage. However, it will be appreciated that store and forward could be provided using a slower switching method but this leads to delays in data transfer and more expensive network nodes.

In the concentrators 45 and 53 the presence of data on one of the input paths causes the control to disable the other input path. Thus both of the inputs 45A and 45B will normally be enabled to the input 53A but on detection of the presence of the forwarded message on the input 45B input 45A is disabled.

Similarly the respective control means of the concentrator 53 will disable the input 53B from the output when data is present on the input 53A.

It will be appreciated that if message contention occurs the first message present on one of the inputs A or B will cause the other input to be disabled. Thus if a message was already using the concentrator 53 by way of the input 53B the later arriving message from the user transmitter 2 will be lost. Accordingly an acknowledging protocol between the user apparatuses is required which may take the form of an acknowledge message set up through the network 9 in a similar manner, but in preference to this mode of working the acknowledge is returned by use of a reverse transmision path set up in parallel through the network nodes. If the user transmitter 2 fails to receive an acknowledge signal within a predetermined period of time it may make a further attempt to send the message. In certain networks there may be alternative routes between particular outputs 15-18 and particular inputs 10-13 which the user transmitters 1-4 may use by assembling a different addressing header for the message.

It will be noted that the path through the distributors and concentrators of a network is held for the duration of transmission of a message, the distributors and concentrators being arranged to return to the free condition on detection of absence of data on the data path for a predetermined period of time.

Figure 2:
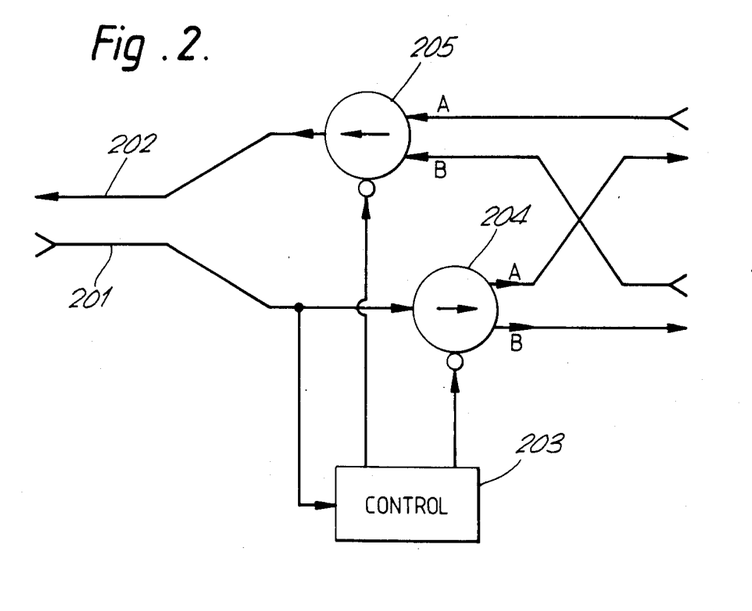
FIG. 2 is a schematic diagram of a distributor of FIG. 1.
Figure 3:
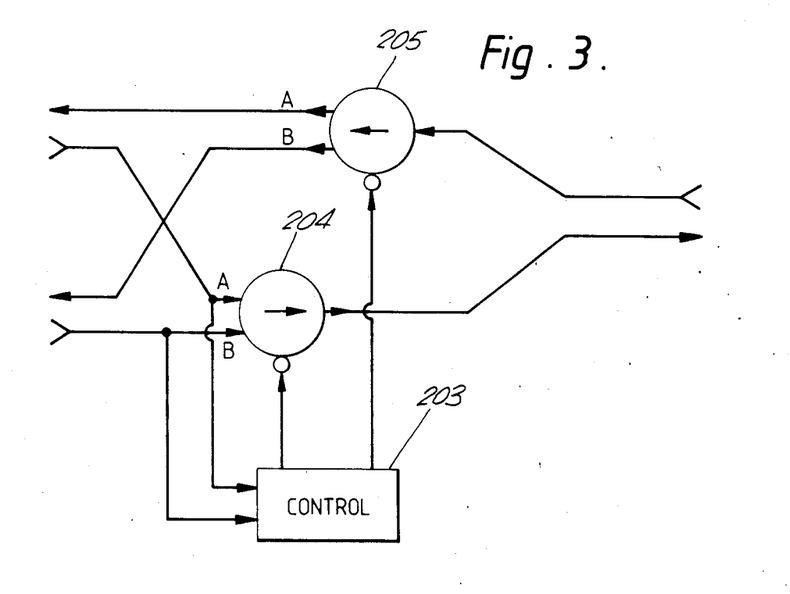
FIG. 3 is a schematic diagram of a concentrator of FIG. 1.

Referring now to FIGS. 2 and 3 switching of the distributors and concentrators is always initiated from the transmission side of a node referred to herein as the primary side, and shown to the left of FIGS. 2 and 3.

In the case of the distributor of FIG. 2 a control circuit 203 detects messages at the primary input 201 and, in dependance on the first bit of the message causes both a forward switch 204 and a reverse switch 205 to set up the path between the A or B connections of the secondary side and the respective forward 201 and reverse 202 path on the primary side. Both of the switches 204 and 205 remain so set until a time-out initiated in the control 203 on detection of the absence of further data on the primary input 201.

The concentrator of FIG. 3 functions in a similar manner with the control 203 detecting a message on either the A or B inputs of the primary and setting up respective forward and reverse paths to the secondary output through the switches 204, 205. However, in the concentrator the control 203 has to ensure the availability of the secondary path before effecting switching. As has been mentioned previously an existing connection between either the A or B input which has not been cleared because a message is passing through will take precedence over a later arriving message. In practice both the A and B inputs on the primary side are enabled to the output and on detection of data on one of the inputs A or B the control 203 disables the other input.

Figure 4:
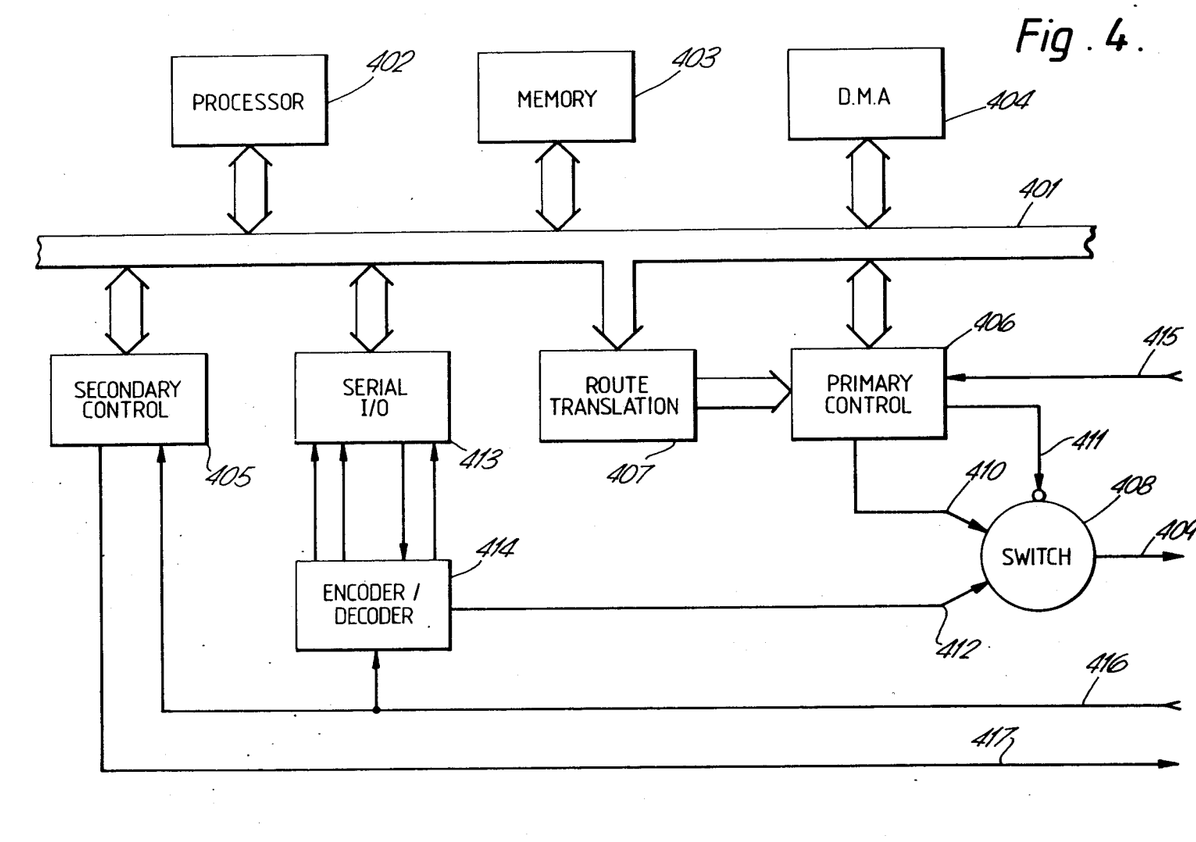
FIG. 4 is a schematic diagram of an interface between apparatus and the network of FIG. 1.

Referring now to FIG. 4 the basic elements of a network interface communicate by way of a data bus 401 and comprise a processor 402, data memory 403 and direct memory access circuit 404. These elements may be a part of the user apparatus and are supplemented by a secondary control 405 and a primary control 406 which may be integral with the processor 402.

If the processor 402 generates a data string for transmission by way of the network it is arranged to assemble the data string with a receiver address (which does not necessarily comprise the network route) and is arranged to store this information in a memory address in the data memory 403 by way of the bus 401. The processor 402 sets the direct memory access circuit 404 to point to the memory address and also sends an instruction to the primary control 406.

On receipt of this instruction the primary control 406 uses the direct memory access circuit 404 to transfer the receiver address from the memory 403 to a route translation device 407 (which may simply be a 'look up table' of a memory) to obtain a set of routing bits for the network.

By use of a control connection 411 the primary control 406 now causes an output switch 408 to set up a path between an input 410 from the primary control 406 to the output 409 which is connected to one of the inputs of the switching network. The primary control now commences a time out whilst forwarding the routing bits one at a time by way of the input 410 and the switch 408 to the network input with the necessary seize pulses (if any) inserted. On receipt of an acknowledgement signal the primary control ceases sending routing bits and causes a serial input/output device to use the direct memory access circuit to effect transfer of the data from the memory 403 by way of the bus 401 to itself. The serial input/output device 413 effects a parallel to serial conversion of the data for transmission. Immediately on completion of sending of the routing bits (that is on receipt of an acknowledge signal) the primary control 406 causes the output switch 408 to connect the output 409 to another input 412 by way of which the data is sent.

An encoder/decoder 414, in the present case acting as an encoder, commences demanding bits from the serial input/output circuit 413 and on receiving each bit converts it as necessary and forwards the digits to the network.

As has been previously mentioned the network nodes set up a reverse path in parallel with the forward path of the network. The primary control 406 awaits an acknowledgement of the message sent from the receiving apparatus which acknowledgement is received by way of an input 415. If an acknowledgement is not received within a prespecified period the primary control 406 may make further attempts to send the message in a similar manner. Should the system fail to transfer the message after a prespecified number of attempts the primary control 406 may be arranged to transfer a message failure signal to the processor 402 or to send a message by way of the network to an alarm or testing apparatus.

It is here noted that two acknowledge signals are available to the system either or both of which may be used. In the case of 'positive' acknowledgement the success of a path set up may be indicated by the return of the clock signal on the reverse path by the receiving interface. For 'negative' acknowledging a concentrator in the network detecting contention may return a single clock pulse indicating failure of the message to pass. A combination of 'positive' and 'negative' acknowledgement may be used to reduce network holding time if contention occurs.

Received messages are handled by the secondary control 405. When the secondary control 404 detects a message on a forward path 416 of the secondary it is arranged to return an acknowledgement signal by way of a secondary reverse path 417. The incoming message is decoded by the encoder/decoder 414 and is transferred to the input/output 413 which carries out a serial to parallel conversion of the incoming data.

The secondary control 405 will cause the message to be transferred as it is received by use of the direct memory access circuit 404 which is set up by the processor 402 to point to a specified address of the memory 403. It will be appreciated that a data string which contains too many bits for a single parallel transfer on the data bus 401 may be transferred 'n' bits at a time as each 'n' bits are received, the direct memory access circuit 404 being stepped on by the processor 402 or independantly as each 'n' bit word is transferred.

Whilst as hereinbefore described only switched forward and reverse data transmission paths have been defined, it is here noted that a switched clock path is also provided to obviate the need for encoding data and clock signals for transmission and to simplify the logic of the distributors and concentrators.

Figure 5:
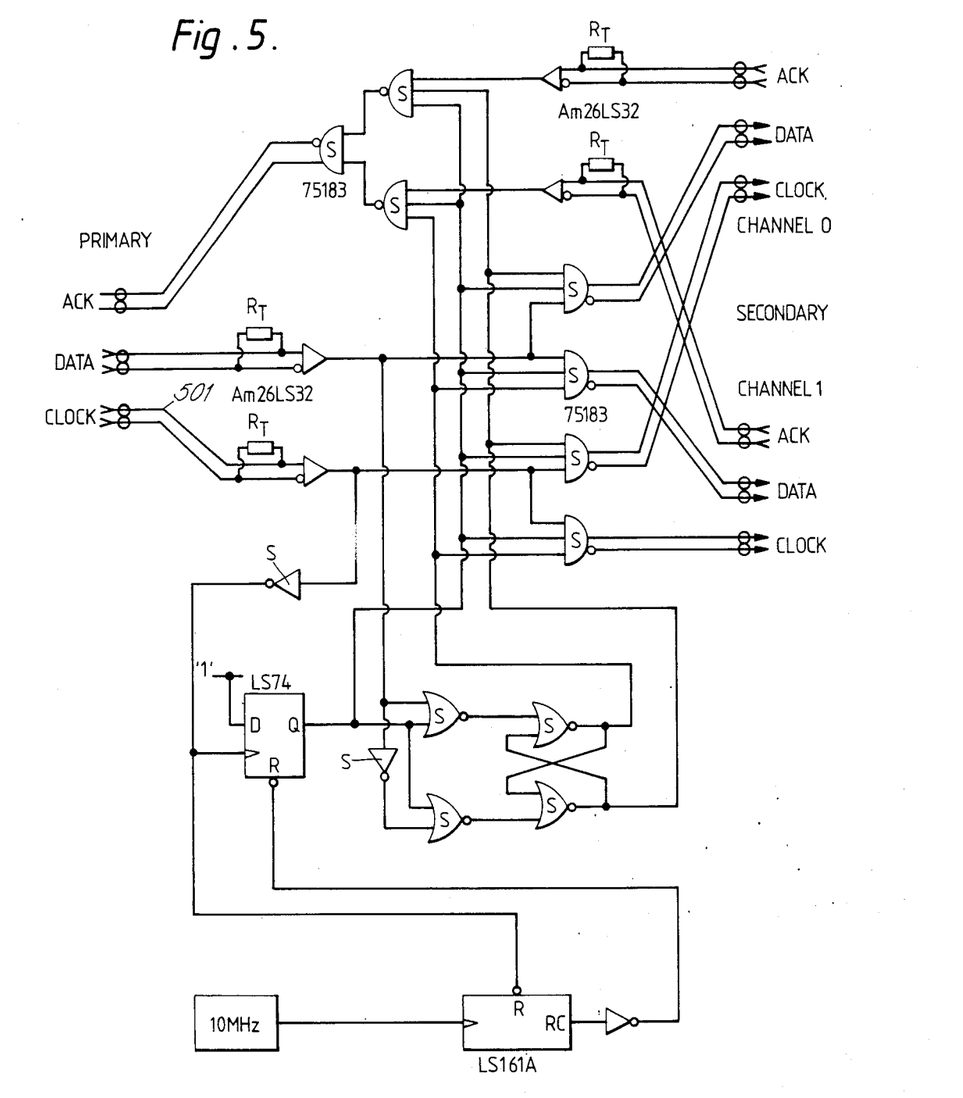
FIGS. 5 and 6 are respective logic diagrams of the distributor and the concentrator of FIGS. 2 and 3.

Referring now to FIG. 5 the binary distributor is a simple circuit the operation of which requires little description. When the clock path 501 is idle (that is there is no clock signal present) the node is periodically reset. However the resetting of the circuit is inhibited as soon as a clock signal is present on the clock path 501 and the first data bit is stored in a latch and used to determine which of two output channels (channel 0 or channel 1) is to be used. The selected channel is then enabled connecting the primary forward and reverse paths and the clock path to the appropriate secondary channel paths. As long as the clock path carries clock pulses the distributor will remain so enabled. When the clock path is idle for more than 1.4 microseconds the distributor resets itself.

Figure 6:
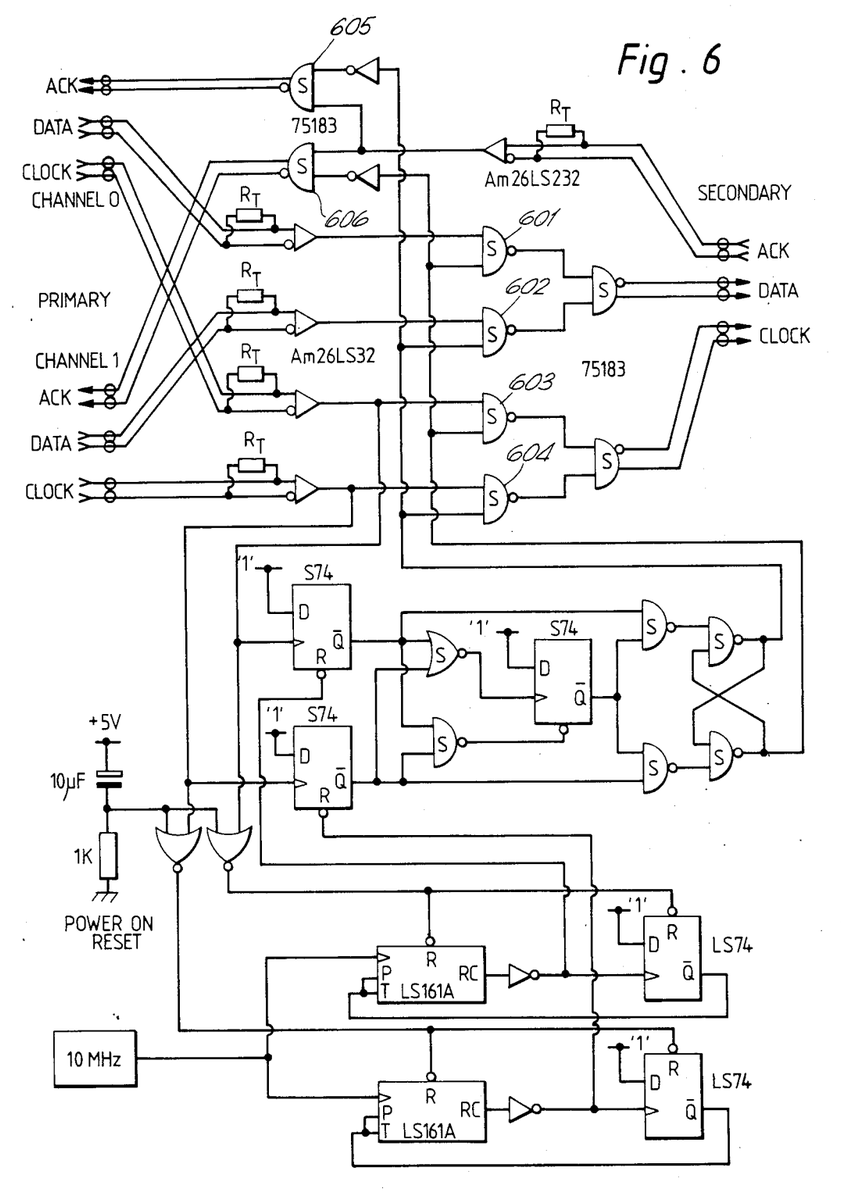

Referring now to FIG. 6 the construction of a binary concentrator whilst a little more complex than the distributor may readily be appreciated. The concentrator has to pass a message with a minimum of delay and for this reason when the concentrator is in its idle state (that is when no data is passing through) both channel 0 and channel 1 forward, reverse and clock paths of the primary side are enabled to the respective paths on the secondary side the forward channels being connected through to the secondary by 'OR' gates 601-606. When a clock signal is present on one of the input clock channels, the other channel paths are disabled until both input clock paths have been in the idle state for 1.4 microseconds. In this manner switching may be effected in half a bit period and even if two messages arrive at substantially the same time one will be passed unimpaired whilst the other is lost.

It will be realised that both input clock paths must be in the idle state before the concentrator returns to its idle state (with both paths enabled through) to prevent part of a message which has been "lost" from falsely becoming attached to the end of a message which has successfully passed through the concentrator.

Figure 7:
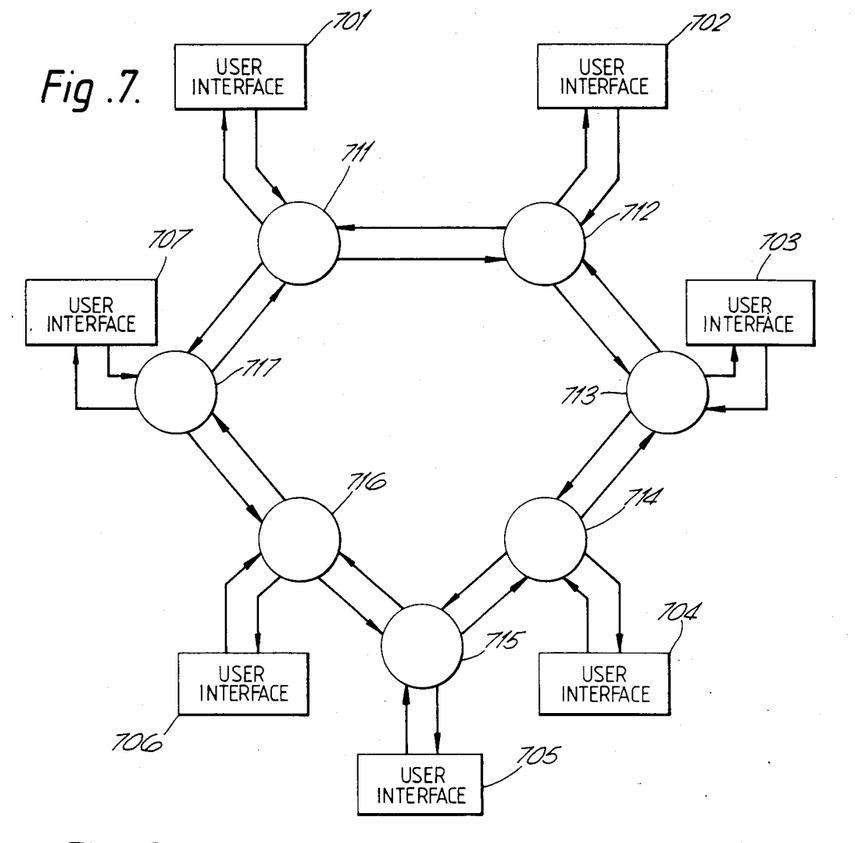
FIG. 7 is a schematic diagram of a bidirectional data signal switching system in a loop formation.

In a preferred network, nodes having both distributors and concentrators are arranged in the form of a loop as shown in FIG. 7 to which reference is now made. In this network seven user interfaces 701-707 are interconnected by way of a bothway transmission loop having one access point node 711-717 for each user interface. The network is made up of distributors and concentrators of the kind hereinbefore described and it will be apparent that every user interface 701-707 will have at least two routes through the network to every other user interface 701-707.

Again whilst only a single transmission path has been shown in each of the clockwise and anticlockwise loops the switched path comprises clock, forward and reverse transmission paths.

Figure 9:
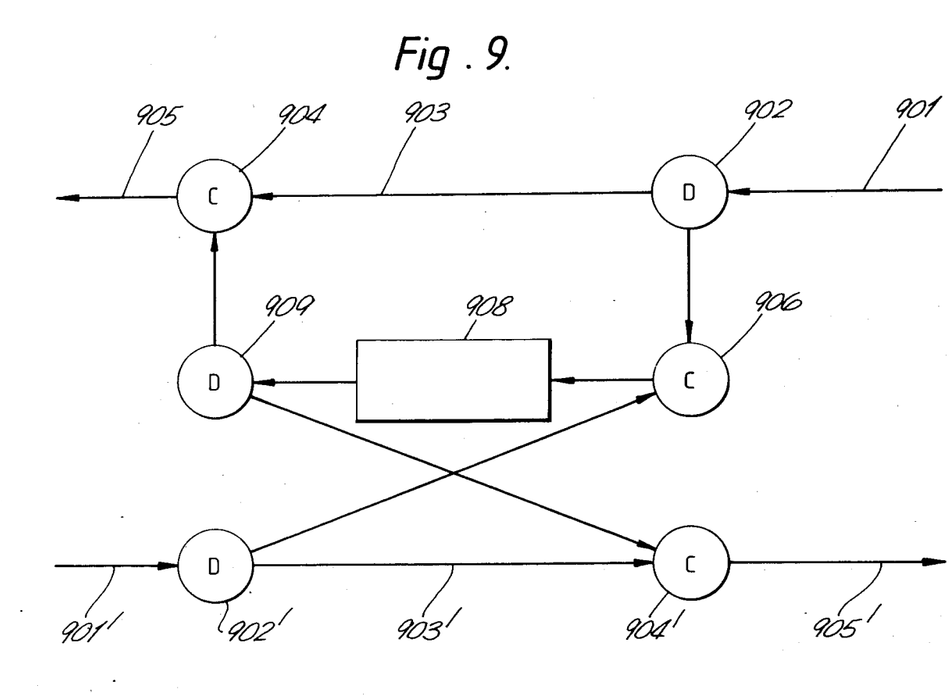
FIG. 9 is a schematic diagram of an access node point of the loop of FIG. 7.

The interconnection of the paths at each of the access points 711-717 may be seen in FIG. 9 in which only the forward transmission path is represented but which is made up of distributors and concentrators of the kind shown in FIGS. 5 and 6 that is including reverse transmission and clock paths.

As may be seen a message on the anticlockwise transmission path 901 at one of the access points may be switched by a distributor 902 either on a through path 903 by way of a concentrator 904 to output 905 by use of output 902A or by way of output 902B to another concentrator 906 to a user interface 908.

On the clockwise transmission path corresponding switching from the input 901' to the output 905' is available for the through route, and the output 902'B of the distributor 902' may be used to pass a message by way of the concentrator 906 to the user interface 908.

For messages originating at the user interface 908 a selector is used to select either the anticlockwise transmission path 905 by way of output 909A and the concentrator 904 or the clockwise transmission path 905' by way of output 909B and the concentrator 904'.

I claim:

1. A digital data signal switching system for transmitting messages via a plurality of selectable transmission paths each of which connects one of a plurality of inputs of the system to one of a plurality of outputs of the system, each said message transmitted from an input of the system being a string of digital data at least the first digit of which defines a route through the system, said system comprising:

a plurality of distributor switches and a plurality of concentrator switches interconnected to provide said plurality of selectable transmission paths and also to provide a plurality of selectable backward paths each one in parallel with a respective one of said transmission paths;

each said distributor switch being a switch having a transmission path input and a plurality of transmission path outputs to any one of which the input may be exclusively and selectively connected, and being arranged to respond to the first digit of a message on arrival at a transmission path input thereof to select a transmission path segment from that input to a transmission path output of the distributor switch together with a parallel backward path segment in dependence upon the value of that first digit and in so doing to omit the first digit from the message passed on, such that in passing through a plurality of said distributor switches the message is progressively shortened by the omission of respective first digits; and each said concentrator switch being a switch having a plurality of transmission path inputs and a transmission path output to which any one of the plurality of inputs may be exclusively and selectively connected to provide a transmission path segment through the concentrator switch together with a parallel backward path segment, and being arranged to fail to onwardly transmit a message if contention occurs due to the data string of that message arriving at one of the transmission path inputs of said concentrator switch when an exclusive connection between another transmission path input of the concentrator switch and the output thereof is already in use, each selected said transmission path and respective parallel backward path between an input of the system and an output of the system being progressively set up by transmission of a message through the distributor switches and concentrator switches, and failure of a transmitted message due to contention being indicated to the respective input of the system by means of an incompletely set up selected backward path.

2. A system as claimed in claim 1, in which said messages carried by the system are binary-coded, and in which each distributor switch has one input and two outputs, the output being selected in dependence upon the first bit of a message received at the input.

3. A system as claimed in claim 1 or claim 2, in which the inputs and outputs of the system are connectable via a plurality of nodes, each said node including at least one said distributor switch and at least one said concentrator switch.

4. A system as claimed in claim 3, in which the plurality of nodes are connected in a loop formation.

5. A system as claimed in claim 4, in which each said node includes a number of distributor switches and concentrator switches arranged such that a transmission path between any of the plurality of inputs of the system and of the plurality of outputs of the system may be selectively effected in either direction of transmission around the loop.

* * * * *